US007979466B2

(12) United States Patent
Wagner

(10) Patent No.: US 7,979,466 B2
(45) Date of Patent: Jul. 12, 2011

(54) DOCUMENT STORAGE ACCESS ON AN UNSOLICITED TRANSFER BASIS

(75) Inventor: Eric Wagner, Scottsdale, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 303 days.

(21) Appl. No.: 12/369,886

(22) Filed: Feb. 12, 2009

(65) Prior Publication Data

US 2010/0011416 A1 Jan. 14, 2010

Related U.S. Application Data

(63) Continuation-in-part of application No. 12/170,352, filed on Jul. 9, 2008, and a continuation-in-part of application No. 12/170,363, filed on Jul. 9, 2008.

(51) Int. Cl.
G06F 17/30 (2006.01)
(52) U.S. Cl. ....................................................... 707/781
(58) Field of Classification Search ........... 707/2, 104.1, 707/781; 709/206, 207
See application file for complete search history.

(56) References Cited

U.S. PATENT DOCUMENTS

| | | | |
|---|---|---|---|
| 6,148,064 A | 11/2000 | Christensen et al. | |
| 6,335,963 B1 | 1/2002 | Bosco | |
| 6,338,082 B1 | 1/2002 | Schneider | |
| 6,353,852 B1 | 3/2002 | Nestoriak, III et al. | |
| 6,385,655 B1 | 5/2002 | Smith et al. | |
| 6,895,431 B1 | 5/2005 | Bero | |
| 7,194,513 B2 | 3/2007 | Sharif et al. | |
| 7,653,302 B2 | 1/2010 | Limberis et al. | |
| 2001/0034769 A1* | 10/2001 | Rast | 709/206 |
| 2001/0047389 A1 | 11/2001 | Prahlad et al. | |
| 2001/0049786 A1 | 12/2001 | Harrison et al. | |
| 2002/0188690 A1 | 12/2002 | Lee | |
| 2003/0074411 A1 | 4/2003 | Nale | |
| 2004/0039786 A1* | 2/2004 | Horvitz et al. | 709/207 |
| 2004/0158609 A1 | 8/2004 | Coppinger et al. | |
| 2005/0102348 A1 | 5/2005 | Parsons et al. | |
| 2007/0006321 A1 | 1/2007 | Bantz et al. | |
| 2007/0016613 A1 | 1/2007 | Foresti et al. | |
| 2007/0124396 A1 | 5/2007 | Febonio et al. | |
| 2007/0233790 A1 | 10/2007 | Agarwal et al. | |
| 2009/0177752 A1 | 7/2009 | Himmelstein | |

OTHER PUBLICATIONS

Nov. 5, 2010 Non-Final Rejection, U.S. Appl. No. 12/170,352 (Publication US 2010-0011036 A1).
Dec. 17, 2010 Response to Nov. 5, 2010 Non-Final Rejection, U.S. Appl. 12/170,352 (Publication US 2010-0011036 A1).
Nov. 8, 2010 Non-Final Rejection, U.S. Appl. No. 12/170,363 (Publication US 2010-0010998 A1).
Dec. 17, 2010 Response to Nov. 8, 2010 Non-Final Rejection, U.S. Appl. No. 12/369,901 (Publication US 2010-0011448 A1).
Sep. 17, 2010 Non-Final Rejection, U.S. Appl. No. 12/369,901 (Publication US 2010-0011448 A1).

(Continued)

*Primary Examiner* — Etienne Leroux
(74) *Attorney, Agent, or Firm* — Chris A. Watt

(57) ABSTRACT

Systems and methods of the present invention allow a file owner to upload and store a file to a File Storage Area. Through a series of communications, a file owner may provide an intended file recipient access to the file without a request by a file requester. The file owner may grant permissions to access the file and notify the intended file recipient of the results.

17 Claims, 16 Drawing Sheets

OTHER PUBLICATIONS

Dec. 17, 2010 Response to Sep. 17, 2010 Non-Final Rejection, U.S. Appl. No. 12/369,901 (Publication US 2010-0011448 A1).
PCT Application Publication WO 02/101620 A1 to IN, Hyoung-Woo, International Publication Date Dec. 19, 2002.
Mar. 4, 2011 Final Rejection, U.S. Appl. No. 12/170,352 (Publication US 2010-0011036 A1).
May 9, 2011 Response to Mar. 4, 2011 Final Rejection, U.S. Appl. No. 12/170,352 (Publication US 2010-0011036 A1).
Mar. 4, 2011 Final Rejection, U.S. Appl. No. 12/170,363 (Publication US 2010-0010998 A1).
May 9, 2011 Response to Mar. 4, 2011 Final Rejection, Application 12/170,363 (Publication US 2010-0010998 A1).
Feb. 9, 2011 Non-Final Rejection, U.S. Appl. No. 12/369,886 (Publication US 2010-0011416 A1).
May 9, 2011 Response to Feb. 9, 2011 Non-Final Rejection, U.S. Appl. No. 12/369,886 (Publication US 2010-0011416 A1).

* cited by examiner

DOCUMENT STORAGE ACCESS ON AN UNSOLICITED TRANSFER BASIS

CROSS REFERENCE TO RELATED PATENT APPLICATIONS

This patent application is a continuation-in-part of the following previously-filed patent applications:

U.S. patent application Ser. No. 12/170,352, to Eric Wagner, with a filing date Jul. 9, 2008 and titled "DOCUMENT STORAGE ACCESS ON A PER-APPROVAL BASIS."

U.S. patent application Ser. No. 12/170,363, to Eric Wagner, with a filing date Jul. 9, 2008 and titled "DOCUMENT STORAGE ACCESS ON A TIME-BASED APPROVAL BASIS."

This patent application is related to the following concurrently-filed patent applications:

U.S. patent application Ser. No. 12/369,901, "MAINTAINING CONTACT WITH A DOCUMENT STORAGE FILE OWNER."

The subject matter of all patent applications is commonly owned and assigned to The Go Daddy Group, Inc. All applications are incorporated herein in their entirety by reference.

FIELD OF THE INVENTION

The present inventions generally relate to the field of online storage and, more specifically, systems and methods for safekeeping documents and files stored online.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding webpages on the Internet is generally known as the World Wide Web (WWW) or simply the Web. The Internet or the World Wide Web may be used as a tool to store and share files with other users of the Internet.

SUMMARY OF THE INVENTION

The present invention provides systems and methods for the safekeeping and transfer of files and documents, thus overcoming substantial limitations in the relevant art. In an example embodiment, a file owner may store a file or other documents or software online. Through a series of communications between a file requestor and the file owner, the file may be shared with an intended file recipient, and the file owner may be alerted to any defect in communication with the file owner.

An exemplary method of authorizing an unsolicited file transfer to a predetermined recipient may comprise several steps including the step of hosting a file within an online file folder on a hosting computer. Authorization may be accepted from a file owner for an unsolicited file transfer to a predetermined recipient after expiration of a predetermined time period, who may then be granted access to the file.

An exemplary method of maintaining contact with an online file owner may comprise several steps including the step of hosting a file within an online file folder on a hosting computer. A first contact for an owner of the file may then be verified, and if the first contact fails, a second contact may be used to alert the owner of the contact failure.

The above features and advantages of the present invention will be better understood from the following detailed description taken in conjunction with the accompanying drawings.

DETAILED DESCRIPTION

Figure 1:
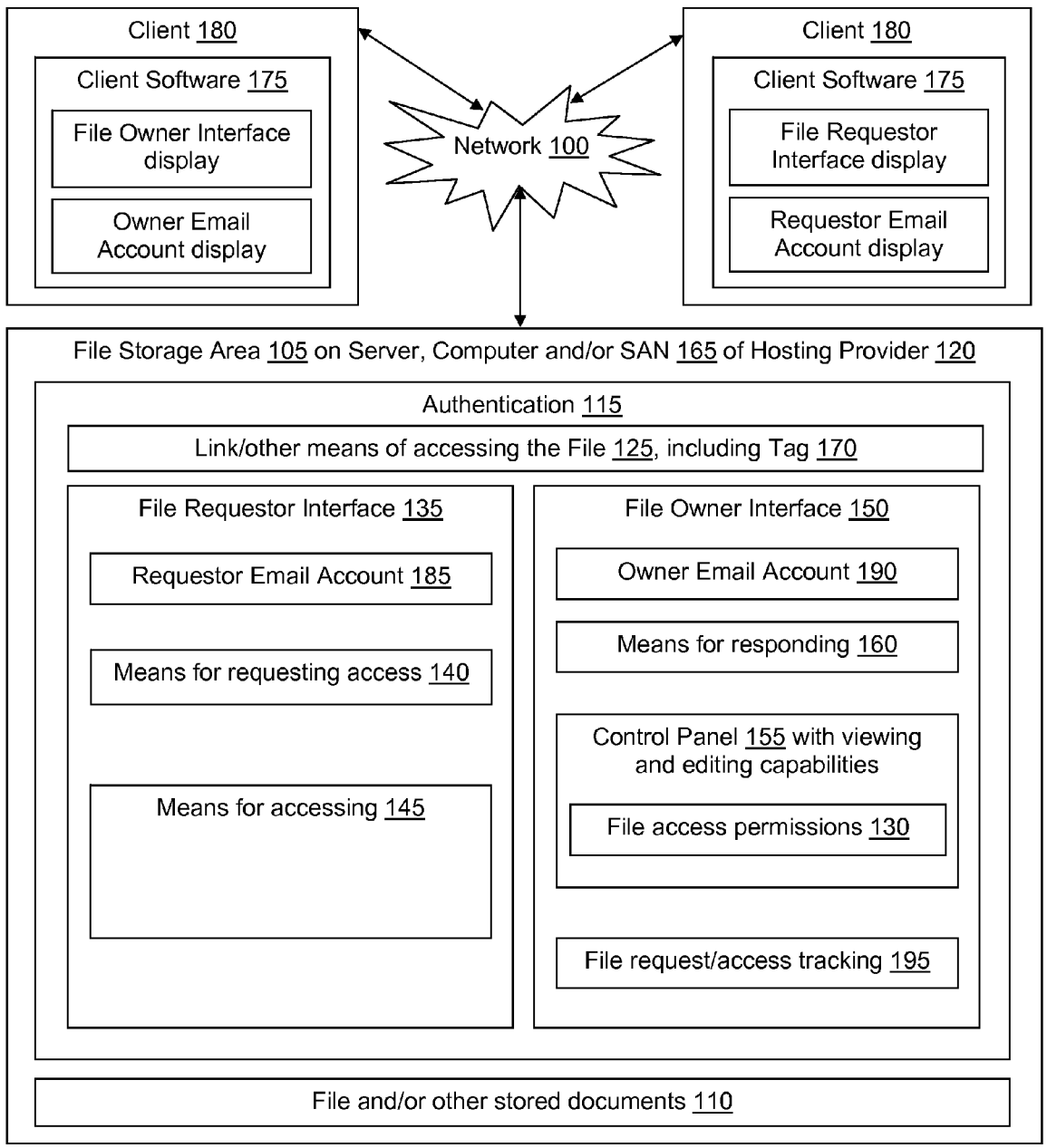
FIG. 1 illustrates a possible embodiment of a system for safeguarding documents online.

The present inventions will now be discussed in detail with regard to the attached drawing figures which were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A Streamlined System for Document Storage Access

As shown in a streamlined example embodiment of a document storage access system in FIG. 1 and subsequent figures, the system for document storage access may include a Network 100. A File Storage Area 105 containing one or more Files 110 or other stored documents may be hosted by a Hosting Provider 120 and communicatively coupled to the Network 100.

The example embodiments herein place no limitation on network configuration or connectivity. Thus, as non-limiting examples, the Network 100 may be the Internet, an intranet, an extranet, a local area network, a wide area network, a wired network, a wireless network, a telephone network, any other network now known or later developed in the art or any combination thereof.

The File Storage Area 105, also referred to herein as an Online File Folder, may be any means of storage for storing files or other information. The File Storage Area 105 may be online, which may include the Internet, but also including any Intranet or other Network 100 of computers or servers. As shown in the streamlined example embodiment shown in FIG. 1, the File Storage Area 105 may be used for storing files, documents, backups, applications/other install packages, web pages, commands, software or any other needed means of online or offline storage space, or any combination thereof. The File Storage Area 105 may also include any combination of hard drives, RAM or other computer memory storage devices that are known in the art.

The means of online or offline storage for storing files may include, in addition to the File Storage Area 105, a File Transfer Protocol (FTP) Site, which may allow the file requestor or an intended file recipient to access the File 110 by a number of means and after proper authentication, as described in more detail below.

FTP may be defined as a network protocol used to transfer data from one computer to another through a network such as the Internet, and exchanging files independent of the operating systems involved. Likewise, an FTP Site may include a site hosted on a Server, which may allow the transfer of the File and/or other stored documents 110 using FTP.

The File and/or other stored documents 110 may likewise include, but are not limited to one or more files, documents, backup applications/software, applications/other install packages, web pages, commands, software, text files, multimedia, graphics, audio files, video files, animation files or any combination thereof.

The File Storage Area 105 may further be part of a Storage Area Network (SAN) 165 wherein a hosting computer and/or server may be communicatively coupled with at least one additional computer 165 to provide additional storage space to the File Storage Area 105 or any other storage areas as needed by the file owner.

The Hosting Provider 120 may provide hosting services including, but not limited to hosting one or more Servers, Computers and/or SAN 165 in a data center as well as providing the general infrastructure necessary to offer hosting services to Internet users including hardware, software, Internet web sites, hosting servers, and electronic communication means necessary to connect multiple Servers, Computers and/or SAN 165 to the Internet or any other Network 100.

The file owner, as well as the file requestor, or any intended file recipient may be an individual or an entity including, but not limited to, a person, a business, a governmental institution, an educational institution, a non-profit organization, or a social organization or any other individual or organization capable of using the File and/or other stored documents 110.

In one non-limiting example embodiment, notification of, access to and/or transfer of the File 110 and/or any related File access permissions 130 may be initiated by the file owner without being requested by a file requester, in which case the intended file recipient may have the same characteristics as a file owner or file requestor, as described above.

Authentication 115, also referred to herein as authorization, may be accomplished by any means of attempting to verify the identity of the sender of a communication, such as a request to log in or access a resource. The thing being authenticated may be, but is not limited to, a person using a system, a computer itself, or a computer program.

As non-limiting examples, Authentication 115 may utilize any weak or strong authentication system known in the art or developed in the future, such as username/password, challenge/response, OpenID, MICROSOFT CARDSPACE, any Single Sign-On (SSO) methodology, Public Key Infrastructure (PKI), digital signatures, zero-knowledge proofs, Kerberos, smart card, biometrics (retina, voice, fingerprint, or DNA recognition) and/or any combination thereof. The authentication environment may further be secured with anti-virus software, firewalling and/or at least one virtual private network.

Authentication may be used to provide access to the File Storage Area 105 or FTP Site, as well as any Control Panel 155 within the File Storage Area 105, thereby providing the file requester or intended file recipient access to the File 110.

Such authentication may be sent to and may be unique to the file requester or intended file recipient, such as a unique username/password. The file requester or intended file recipient's access may likewise be limited to a specific intended File 110 or file folder which may contain the File 110. Although initially hidden, the File 110 or file folder intended for the file requester or intended file recipient may be displayed in the File Storage Area 105 or FTP Site when the file requester or intended file recipient is authenticated.

In other words, hidden files may be revealed and displayed in the File Storage Area 105 or FTP Site after proper (and possibly unique) authentication. Hidden files may be any directory or file which is not shown to the user by default. Once revealed and displayed, such files may (but not necessarily) use drag and drop technology to upload and/or download files from the File Storage Area 105 and/or FTP Site to a Client. Drag and drop technology may be support for the action of clicking on a virtual object and dragging it to a different location or onto another virtual object.

The Server, Computer and/or SAN 165, also referred to herein as a Hosting Computer, as well as any complimentary Client 180, and the software utilized by any of the aforementioned may be communicatively coupled to the Network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

In a non-limiting example embodiment, the File Storage Area 105 may include a browser-based application that allows the file owner to store and access important files online, similar to how a file or folder on a hard drive may be stored and accessed. The File Storage Area 105 may provide functions for uploading, finding, managing and organizing the file owner's files, including means for granting or denying limited access requests.

Once authenticated, the file owner may have and give access to particular Files 110 stored in the File Storage Area 105. The file owner or other users may then perform actions on the Files 110 in the manner authorized to and by the user, such as transmitting the files as attachments to emails or transmitting the files to any complimentary client.

As shown in FIG. 1 and subsequent figures, a Link or other means of accessing the File 125 may be used to view, edit and/or access the File 110. This Link or other means of accessing the File 125 may further include a Tag 170 or other means of embedding information about one or more access permissions associated with the File 110. Thus, the Link or other means of accessing the file 125 may be utilized in requesting access to the File 110, granting or denying access to the request, granting access to the File 110 without a request, and/or accessing the File 110 for download or transfer once access to the File 110 has been granted.

The Link or other means of accessing the File 125 may be a reference or navigation element in a document to another section of the same document or to another document that may be on or part of a different domain. Additional means for accessing the file may also be used, including, but not limited to a menu used to select the File 110 from a list of choices; an icon or other graphical image used to represent the File 110, possibly including an embedded Link 125; a widget or control, including but not limited to a text-box, button, hyperlink, drop-down list, check-box, radio button, data grid, etc. or any other means of accessing a File 125 now known or later developed in the art.

The viewing, editing and/or accessing of the File 110 may be accomplished by using the Link or other means of accessing the File 125. "Other means of accessing the File" 125 is not limited to the Link 125 and may include any of the graphical user interface widgets or controls disclosed in the preceding paragraph and/or any technique included in Means for accessing 145 the File 110, discussed in more detail elsewhere in this specification.

As a non-limiting example, the File 110 may be selected from a User Interface within a panel of files and/or file folders to be selected, displayed or accessed on a general purpose computer, using any of the means of accessing the file and graphical user interface widgets or controls disclosed in the preceding paragraph. Likewise, the controls relating to the widgets, commands and controls of the selected available files may also be displayed on a panel and executed using the means for accessing the File 110 disclosed in the preceding paragraph.

The Tag 170 associated with the Link or other means of accessing the file 125 may be one or more non-hierarchical keywords, terms, phrases, HTML tag attributes or any other means of marking the Link 125 to accommodate the request, permissions and access of the File 110 in such a way that it may be assigned to the Link or any of the means of accessing the File 125 described above.

This kind of metadata (or data about data, in this case, data about the File 110 and it's respective File access permissions 130) may help describe the item, may allow it to be tracked for purposes of recording File 110 requests and access, or may carry information utilized in requesting access to the File 110, granting or denying access to the request, and/or accessing the File 110 for download or transfer once access to the File 110 has been granted. Tags may be assigned according to the file requester when the file is requested or accessed or according to the file owner when a grant or denial of File access permissions 130 is given by the file owner.

In a non-limiting example embodiment, the metadata may be contained within the Tag 170 in the form of tag attributes within an HTML tag, possibly as a hidden field. A non-limiting example of such a tag may exist within the code as follows:

<a href=exampleFile.html approvalStatus=approved>Access the file now</a>.

The File Storage Area 105 may include a File Requestor Interface 135, an Intended File Recipient Interface and a File Owner Interface 150, accessible to the file requester an intended file recipient and the file owner respectively, possibly after Authentication 115 described above. Various communications between the file requester, the intended file recipient and the file owner may allow the File 110 to be accessed by the file requestor or the intended file recipient.

In one non-limiting embodiment, these communications may be via a Requestor Email Account 185 assigned to the file requester, a Recipient Email Account assigned to the intended file recipient and/or an Owner Email Account 190 assigned to the file owner. The Requestor Email Account 185, the Recipient Email Account and the Owner Email Account 190 may be capable of displaying and sending, respectively, the Link or other means of accessing the File 125 and any associated message.

The Requestor Email Account 185, the Recipient Email Account and the Owner Email Account 190 may all be capable of delivering the File 110, the Link and/or other means of accessing the File 125 among the file owner, the file requester and/or the intended file recipient. This may be accomplished by sending the Link 125 or other Means of accessing 145 the File 110 to the intended recipient using appropriate contact information, or sending the File 110 as an attachment to an appropriate means of contacting the intended recipient. The Link 125 may include a metadata Tag 170, embedded within the Link 125 which may contain information to access the File 110.

The associated message may be integrated into the File 110 and may include any information related to the File 110. As non-limiting examples, such a message may include instructions for the use of the File 110. Any streaming or multimedia technology now known or later developed in the art may also be used to send the message, instructions or a multimedia goodbye to the intended recipient. Non-limiting examples of such streaming and multimedia technologies may include, but are not limited to graphics, video, slideshows, streaming video, streaming audio, etc.

Communications may be by any means of telecommunication now known or later developed in the art (text, IM, mobile phones, desktop notification, monthly ping, etc.), and any reference to email or email accounts within this disclosure may also be accomplished using these forms of communication. Such communications may be any assisted transmission of signals over a distance for the purpose of communication, and may involve, but are not limited to email, text messaging, instant messaging, desktop notification, monthly ping, etc. using electronic transmitters such as the telephone, mobile phone, Bluetooth, television, radio, computers, the Internet or any combination thereof possibly working together in a Network 100 as described elsewhere in this disclosure.

Contact information using such communications, including alternate contact information, may be stored for a file owner, a file requester and any other intended file recipient, allowing contact to be established, maintained, accessed and used to send requests or responses. Non-limiting examples of such contact information may include email addresses, instant messaging contacts, texting numbers, mobile phone numbers, etc. Information for authentication, as describes elsewhere in this specification may also be stored together with or independent from the contact information.

Pinging, also referred to herein as verifying, as a form of communication is not limited to monthly pinging, as described above. Pinging may be a computer network tool used to test whether the contact information for the file owner, file requestor and/or intended file recipient is reachable across the network 100.

In one embodiment, the Link or other means of accessing the File 125, described elsewhere in this disclosure may be transmitted back and forth between the file requester, intended file recipient and/or file owner using the means of communication and/or the contact information described above and embedded with the Tag 170 or other information about the one or more File access permissions 130. Such access permissions may be on a per-approval basis or time based, described in more detail in embodiments elsewhere in this disclosure. In the case of the time based approval, a request for the File 110 may not have been made, and the sending of the File 110 or sending of authentication information may be initiated by the file owner and sent to any intended file recipient without a request by the file requester.

In a non-limiting example embodiment, after uploading the File 110 to the File Storage Area 105, the File 110 may be shared with others via Links 125 or unique authentication to the selected File 110 sent by the file owner or requested by the file requester, thereby allowing recipients to access download and/or transfer the File 110. This process may take place at the initial uploading of the shared File 110 or thereafter. To send such a Link 125 or unique authentication, the organization of the File Storage Area 105 may be navigated to find a folder containing the File 110 to share. The files may be selected from a displayed list, perhaps by using checkboxes displayed next to the desired files or any other of the widgets or controls previously described, and a command, possibly in the form of a drop-down box or button or any other of the widgets or controls previously described, may be used to share the selected files. The file owner may then specify an email address or other contract information to which the Link 125 or authentication information may be sent and that Link 125 or authentication information may then be used to access, download and/or transfer the File 110.

As shown in FIG. 1 and subsequent figures, The File Requestor Interface 135, the Intended File Recipient Interface and the File Owner Interface 150 may be user interfaces, accessible after Authentication 115, used to communicate with one another and control the elements within each interface. The user interfaces may be any aggregate of means by which users such as the file requester, intended file recipient and/or file owner interact with the system, such as a particular machine, device, computer program or other complex tools.

In addition, the user interfaces may be graphical, textual and/or auditory information a computer program presents to the file requester or file owner, and the control sequences (keystrokes, movements of the computer mouse, selections with a touch screen etc.) the user employs to control the program. Non-limiting examples of such interfaces include Graphical user interfaces (GUI), Web-based user interfaces, Touch interfaces, Conversational Interface Agents, Live user interfaces (LUI), Command line interfaces, Non-command user interfaces, Object-oriented User Interfaces (OOUI), Voice user interfaces, any other user interfaces now known or later developed in the art, or any combination thereof.

The File Owner Interface 150 may further include a Control Panel 155 with viewing and editing capabilities. This Control Panel 155 may be a computer user interfaces which utilizes a control panel metaphor to allow the user control of software and hardware features. The file requester or file owner may use the Control Panel 155 to add, remove or reinstall an application, change passwords, set basic configuration settings, migrate applications between different control panels or even restart related hardware or software, as well as providing any other control-panel related utilities now known or later developed in the art.

The Control Panel 155 within the File Owner Interface 150 may also allow the file owner to easily upload, save, organize and manage files stored in an File Storage Area 105. The user may upload from or copy files to a Client 180. The file owner may then access the File 110 from any Client 180. Desired applications may also be run, edited or archived by the file owner at the Client 180.

In a non-limiting example embodiment, Control Panel 155 within the File Owner Interface 150 may include a User Interface (UI) with a list of all available Files and/or other stored documents 110. It may also include settings interfaces such as a UI for document storage controls, settings controls and sharing controls. The sharing controls may further include a shared link creator/viewer/editor UI, an automatic access creator/viewer/editor UI, and a limited access to document creator/viewer/editor UI.

The Control Panel 155 may further include one or more access permissions associated with the File 110. These File access permissions 130 may include administrative permissions or access rights to specific users and groups of users. These systems may control the ability of the users affected to view or make changes to the contents of the file system.

In a non-limiting example embodiment, the automatic access creator UI and the limited access document UI may control two possible divisions between the File access permissions, including automatic file access permissions and limited file access permissions. The files associated with these permissions may likewise fall into two categories: automatic access files and limited access files. Limited access files may further include a per-approval group of limited access documents or a time based or safekeeping services (such as document delivery at death) group of limited access documents. The sharing controls UI may create a link to be shared and the file owner may be allowed to specify whether the link would automatically grant access to the document, or whether the link would trigger one of the limited access scenarios.

The divisions of the limited access files and the subdivisions of per-approval and time-based documents may create a type of extra security to require for document safekeeping. Only the limited documents in the division appropriate to the file owner or file requestor's File access permissions 130 may be shown and/or accessed by the file owner or file requester respectively. Such document safekeeping options may be set as part of the file settings within the Control Panel 155.

In the time-based embodiments, the Control Panel 155 within the File Owner Interface 150 may include file designations, using the widgets and controls disclosed elsewhere in this specification for designating requested files, or files intended for an intended file recipient without a request.

The Control Panel 155 may also include a Periodic Clock, which may be displayed, set and synchronized to match a Time-Based Approval Period, also referred to herein as a Predetermined Time Period, after which an intended file recipient may be granted access to the file, with or without a request. The Periodic Clock may be set in any increment of time, including, but not limited to Days, Weeks, Months, Years, etc.

The Control Panel 155 within the File Owner Interface may also include means for preventing unintended access of the File 110 by an intended file recipient prior to expiration of the Time-Based Approval Period, also referred to herein as a Predetermined Time Period. This may be accomplished by establishing a ping of the file owner's contact information.

If the ping returns a faulty contact for the file owner or fails in any other way, alternate contact information from the file owner's contact information may be used, or established and used to access, notify and/or alert the file owner via the Control Panel 155 of the failure of the faulty contact information, and that immediate maintenance is necessary to maintain contact with the file owner.

If the ping is still unsuccessful and fails with the file owner's contact information and alternate contact, an alert may be sent to any available contact information for the file owner prior to an imminent expiration of the Time Based Approval Period, after which the intended file recipient may be granted access permissions to the File 110.

However, if the ping is successful using the contact information and alternate contact, the file owner may be provided means to confirm or cancel access permissions to the File 110. This may be accomplished using the widgets and controls within the Control Panel 155 to select a number of times to confirm with the file owner the intent for allowing access permissions to the File 110, and setting the Periodic Clock to establish a time period between confirmations of access permissions to the File 110.

In both the per-approval and time-based embodiments, the communications between the file requestor and file owner, as well as the File Requestor Interface 135 and the File Owner Interface 150 on a general purpose computer may be used together to create a Means for requesting access 140 to the File 110 by the file requester; a Means for responding 160 by the file owner to the file requestor; and if the file requestor then has access to the File access permissions 130, a Means for accessing 145 the File 110. In one non-limiting example embodiment, the Means for responding 160 includes means for notifying the file requester that the request to access the File 110 has been received by the file owner.

Likewise, if the file owner initiates the Means for accessing 145 and no request is required, the communications between the file owner and the intended file recipient and the Control Panel 155 on the File Owner Interface 150 or any Intended File Recipient Interface as executed on a machine readable medium and/or general purpose computer may be used to create such a Means for Accessing 145 the File 110. The File Owner Interface 150 or any Intended File Recipient Interface can further be used as a Notification of grant or denial of access permissions 240 described in greater detail below.

The Means for Accessing 145 a File 110 may further include, but is not limited to the following: uploading and downloading the File 110 via Authenticated FTP, using authentication information unique to an intended file recipient to access the File 110 in the File Storage Area 105 or FTP Site, dragging and dropping the File 110 to a Client 180 machine using a Client Software 175, sending the File 110 or a Link 125 with a metadata Tag 170 containing information to access the File 110.

The File Owner Interface 150 may further include File request/access tracking 195 which may be a means for tracking both requests for access to the File 110 and actual access to the File 110. These services may be used by file owners trying to track how the stored information is accessed and may allow owners to very carefully track who has requested access to and accessed the File and/or other stored documents 110.

The File Requestor Interface 135, any Intended File Recipient Interface and the File Owner Interface 150 may be displayed in conjunction with Client Software 175 on a Client 180 communicatively coupled to the Network 100 and executed on a machine readable medium and/or general purpose computer.

The Client 180 may be any computer or program that provides services to other computers, programs, or users either in the same computer or over a computer Network 100. As non-limiting examples, the Client 180 may be an application, communication, mail, database, proxy, fax, file, media, web, peer-to-peer, or standalone computer which may contain an operating system, a full file system, a plurality of other necessary utilities or applications or any combination thereof on the Client 180.

A Client 180 may be any application or system including a computer, laptop, telephone, handheld device, etc. that accesses a service (possibly a remote service) on another computer system, generally, but not limited to a server or some type of hosting computer by way of a Network 100 and/or devices that may or may not be capable of running their own stand-alone programs. The client may be a thick (also known as fat or rich) client, a thin client or a hybrid client, which is a mixture of a thick and thin client, in that it processes locally, but relies on a server for storage data.

Non limiting example programming environments for Clients 180 may include JavaScript/AJAX (client side automation), ASP, JSP, Ruby on Rails, Python's Django, PHP, HTML pages or rich media like Flash, Flex or Silverlight.

Client Software 175 may be used for authenticated remote access to a hosting computer or server. These may be, but are not limited to being accessed by a remote desktop program and/or a web browser, as are known in the art.

In one non-limiting example embodiment, the File Storage Area 105 may have the ability to transmit, receive and/or store files either received from or transmitted to the Client 180 over a Network 100. The Client 180 and Client Software 175 may transmit a file from the Client 180 to be stored in the File Storage Area 105 and/or FTP Site, which may then be moved to any additional Client 180.

The File Storage Area 105 and/or FTP Site and the means of transferring, uploading downloading and accessing files may further be used as a marketing tool wherein the service is provided as a method to drive long term subscriptions to subscriptions for the Hosting Provider 120, or may be a means of creating additional revenue for the Hosting Provider 120 via charges separate from or as an add-on to services currently provided.

A System for Approved Document Storage Access

As shown in a streamlined example embodiment of a document storage access system in FIG. 1, the system for document storage access may include an File Storage Area 105 containing at least one File and/or other stored documents 110 wherein the File Storage Area 105 is accessible by a file owner after proper Authentication 115, is hosted by a Hosting Provider 120 and is communicatively coupled to a Network 100. A Link 125 or other means of accessing the File 110 may be included in the File Storage Area 105 wherein the Link 125 or the other means of accessing the File 110 contains information about one or more File access permissions 130.

Figure 2:
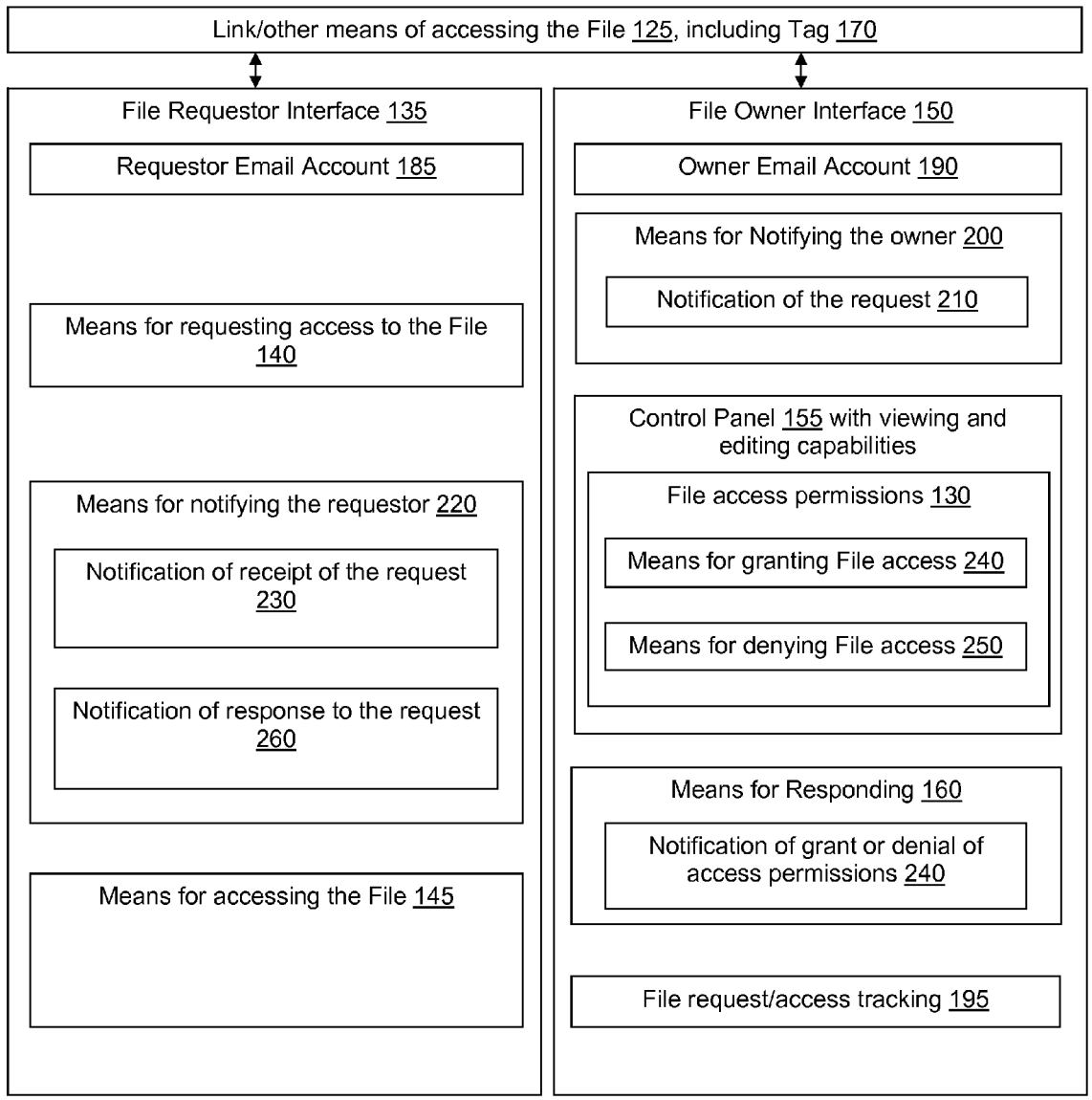
FIG. 2 illustrates a possible embodiment of a system for safeguarding documents online.

As shown in the streamlined example embodiment shown in FIG. 1 and the more detailed example embodiment shown in FIG. 2, a File Requestor Interface 135 including a Requestor Email Account 185, and a File Owner Interface 150 including an Owner Email Account 190 and a Control Panel 155 with viewing and editing capabilities may be included as part of the File Storage Area 105.

As previously described, the communications between the file requestor and file owner, as well as the File Requestor Interface 135 and the File Owner Interface 150 are used together to create a Means for requesting access 140 to the File 110 by the file requester, a Means for responding 160 by the file owner to the file requestor, and if the file requestor is granted access to the File access permissions 130 by the file owner, a Means for accessing 145 the File 110. The details of the File Storage Area 105, the File Requestor Interface 135, the File Owner Interface 150 and the communications between the file requestor and file owner are described in detail elsewhere in this disclosure.

To accomplish these steps of requesting, responding and accessing, the File Owner Interface 150 may include a Means for notifying the file owner 200. The Means for notifying the file owner 200 may include a Notification of the request 210 for File access permissions 130. The Requestor Interface 135 may likewise include a Means of notifying the file requester 220. The means for notifying the requestor 220 may further include a Notification of the receipt of the request 230 by the file owner.

The file owner may then use the viewing and editing capabilities of the Control Panel 155 or other elements of the File Owner Interface 150 as a Means for granting File access 240 or a Means for denying File access 250 in order to grant or deny File access permissions 130 respectively to the file requestor. The Means for responding 160 within the File Owner Interface 150 may then be used to send a Notification of the grant or denial of access permissions 240 to the file requestor.

The Means for notifying the requester 220 within the File Requestor Interface 135 may be used to present to the file requester Notification of a response to the request 260. The Link 125 or other means of accessing the File 110 may be used as a Means for accessing the File 145, including downloading, transferring or any other means of accessing a file now known or later developed in the art.

A Method for Approved Document Storage Access

Figure 3:
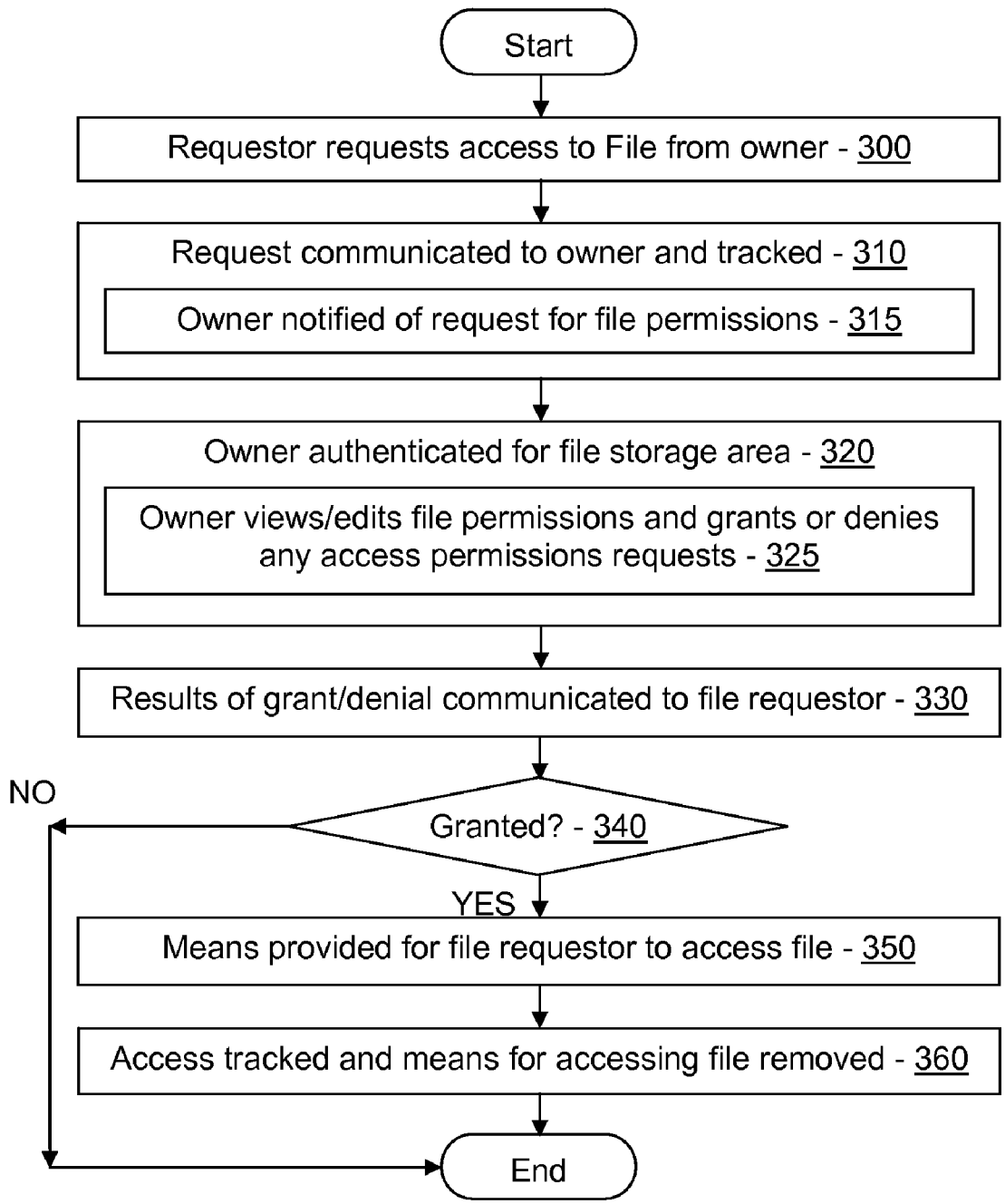
FIG. 3 is a flow diagram illustrating a possible embodiment of a method for safeguarding documents online.

Several different methods may be used to provide and manage the disclosed invention. In an example embodiment illustrated in FIG. 3, an File Storage Area 105 may be provided containing at least one File 110 belonging to a file owner wherein the file owner may, after proper Authentication 115, grant or deny access to the File 110.

The process starts by allowing a file requester to request access to the File 110 from the file owner (Step 300). The request is then communicated to the file owner and tracked (Step 310), possibly using the File request/access tracking 195 within the File Owner Interface 150. The file owner may be notified of the request by the file requester for permissions to access the File 110 (Step 315).

The file owner may then be properly authenticated for the file storage area (Step 320). This Authentication 115 may allow access to the File Storage Area 105, the File Owner Interface 150 and/or the Control Panel 155. By doing so, the file owner may be provided means to view and/or edit any file permissions associated with the File 110, and may grant or deny any requests for access permissions to the File 110 (Step 325). The file owner may then respond to the request to access the File 110 by granting or denying the request to access the File 110 and communicating the response to the file requester (Step 330).

If a determination is made that the access permissions are not granted (Step 340), the process ends. However, if a determination is made that the access permissions are granted (Step 340), means may be provided for the file requester to access the File 110 (Step 350), subsequent to a grant of access to the File 110. Once the file has been successfully accessed by the file requester the access of the file may be tracked, and subsequently the means for the file requester to access the file may be removed (Step 360). Removal of the means for the file requester to access the file may further include removal of the metadata tag or other information regarding the access permissions, or a removal of the Link 125 or other means of accessing the file, so that it is no longer available.

In a non limiting example, including a simple approval for each request, an email may be sent from the Requestor Email Account 185 to the Owner Email Account 190 containing a request for limited access to the File and/or other stored documents 110. A Link 125 or other means of accessing the File containing a Tag 170 may be sent to the file requestor in response to, or as the initial step of, the request.

When the sent Link 125 is clicked by the recipient, the File Storage Area 105 may notify the file owner of the request. It may also tell the file requestor that the approval process has begun. The owner may log into the Control Panel 155 of the File Owner Interface 150, possibly accessing an "approvals" section of the sharing controls UI, and may respond yes or no to the request. If approved, the Link 125 may be tagged so that the next request for that document may start the download. An email may be sent to the file requestor telling them of the results. If access to the File access permissions 130 is approved, the file requestor may click the Link 125 again and the document will download. The File Storage Area 105 may either remove the approved status from that Link 125, or may remove that link altogether. This type of approval control may allow owners to track who has accessed the documents.

A System for Time-Based Document Storage Access

As shown in a streamlined example embodiment of a document storage access system in FIG. 1, the system for document storage access may include an File Storage Area 105 containing at least one File and/or other stored documents 110 wherein the File Storage Area 105 is accessible by a file owner after proper Authentication 115, is hosted by a Hosting Provider 120 and is communicatively coupled to a Network 100. A Link 125 or other means of accessing the File 110 may be included in the File Storage Area 105 wherein the Link 125 or the other means of accessing the File 110 contains information about one or more File access permissions 130.

Figure 4:
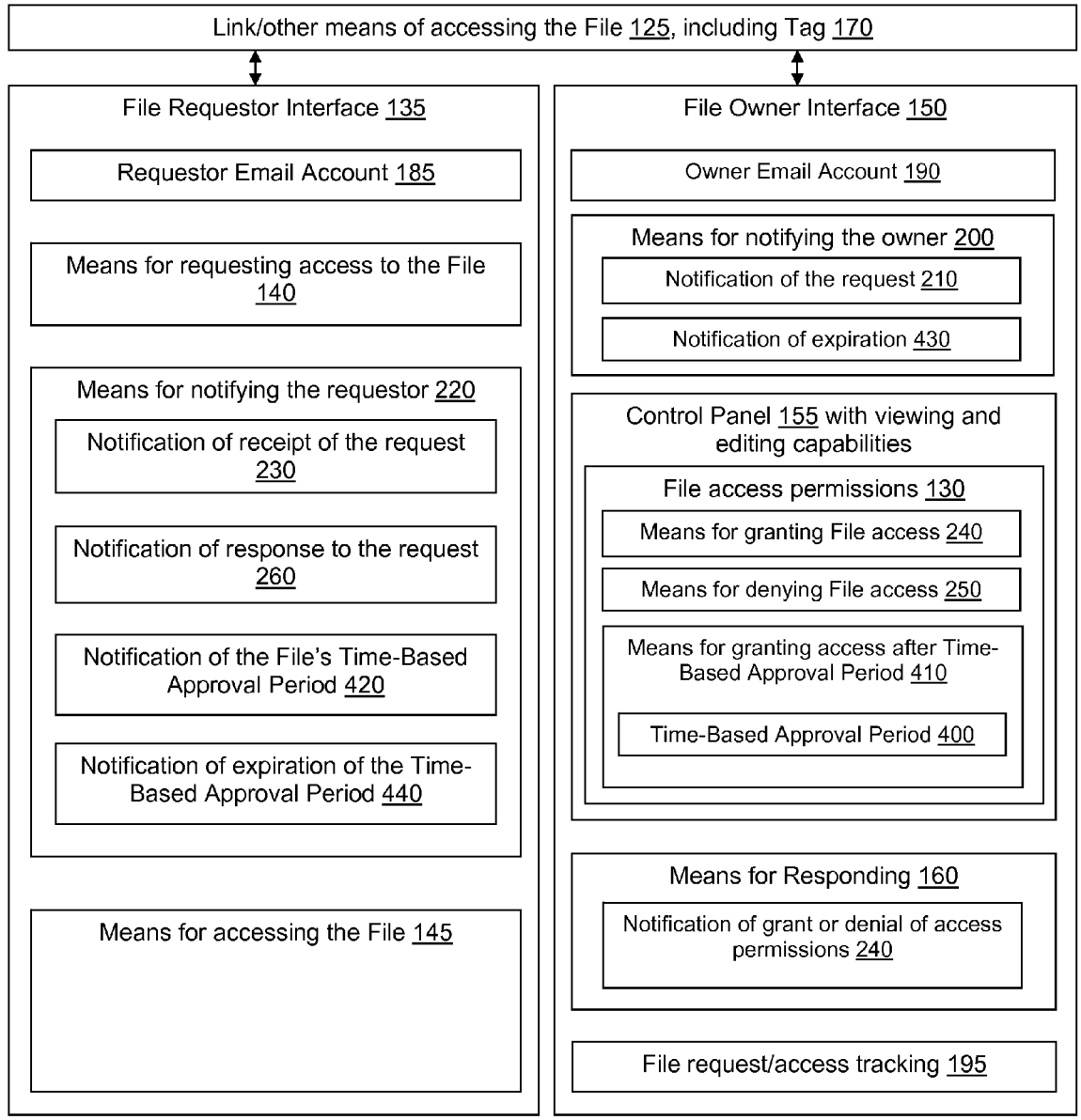
FIG. 4 illustrates a possible embodiment of a system for safeguarding documents online.

As shown in the streamlined example embodiment shown in FIG. 1 and the more detailed example embodiment shown in FIG. 4, a File Requestor Interface 135 including a Requestor Email Account 185, and a File Owner Interface 150 including an Owner Email Account 190 and a Control Panel 155 with viewing and editing capabilities may be included as part of the File Storage Area 105. In addition to the Owner Email Account 190, additional contact information may be viewed and edited by the file owner through the Control Panel 155 or through other elements of the File Owner Interface 150.

As previously described, the communications between the file requestor and file owner, as well as the File Requestor Interface 135 and the File Owner Interface 150 are used together to create a Means for requesting access 140 to the File 110 by the file requestor, a Means for responding 160 by the file owner to the file requestor, and if the file requestor is granted access to the File access permissions 130 by the file owner, a Means for accessing 145 the File 110. The details of the File Storage Area 105, the File Requestor Interface 135, the File Owner Interface 150 and the communications between the file requestor and file owner are described in detail elsewhere in this disclosure.

The Control Panel 155 with viewing and editing capabilities within the File Owner Interface 150 may further include at least one Time-Based Approval Period 400. During this Time-Based Approval Period 400, the file owner may or may not grant or deny the file requester one or more File access permissions 130 as described in detail elsewhere in this application. Through the Means for granting access after the Time-Based Approval period 410 the file owner may set the Time-Based Approval Period 400 in any time increment, including but not limited to minutes, hours, days, weeks, months, years, etc. Through the Means for notifying the requester 220, the file requester may be provided a Notification of the Time-Based Approval Period 420 associated with the File 110.

During the Time-Based Approval Period 400, the Means for notifying the owner 200 may be used to send a notification of the expiration 430, reminding the file owner one or more times that after the expiration of the Time-Based Approval Period 400, the File access permissions 130 may be granted by default. Also during the Time-Based Approval Period 400, the file owner may use the viewing and editing capabilities of the Control Panel 155 or other elements of the File Owner Interface 150 as a Means for granting File access 240 or a Means for denying File access 250 in order to grant or deny File access permissions 130 to the file requester respectively.

The Means for responding 160 within the File Owner Interface 150 may then be used to send a Notification of the grant or denial of access permissions 240 to the file requestor. The Means for notifying the requester 220 within the File Requestor Interface 135 may be used to present to the file requester Notification of the expiration of the Time-Based Approval Period 440. The Link 125 or other means of accessing the File 110 may be used as a Means for accessing the File 145, including downloading, transferring or any other means of accessing a file now known or later developed in the art.

After the expiration of the Time-Based Approval Period 400, the file requestor may automatically access the File 110 with or without additional limitations. Such additional limitations may include any of the Means for denying File access 250 discussed elsewhere in this disclosure.

In one non-limiting example embodiment, a request for automatic file access after the expiration of the Time-Based Approval Period 400 may be set as a default among several options available to the file owner, possibly within the Control Panel 155, regarding who may or may not have access to the File 110 and when such files may be available. Put another way, having a Time-Based Approval Period 400 in relation to a request is only one possible use of the Time-Based Approval Period 400. In additional embodiments, the File 110 may be made available to or denied from the file requester or, in fact, any other users after the expiration of the Time-Based Approval Period 400 without the need of requesting the File 110.

A Method for Time-Based Document Storage Access

Figure 5:
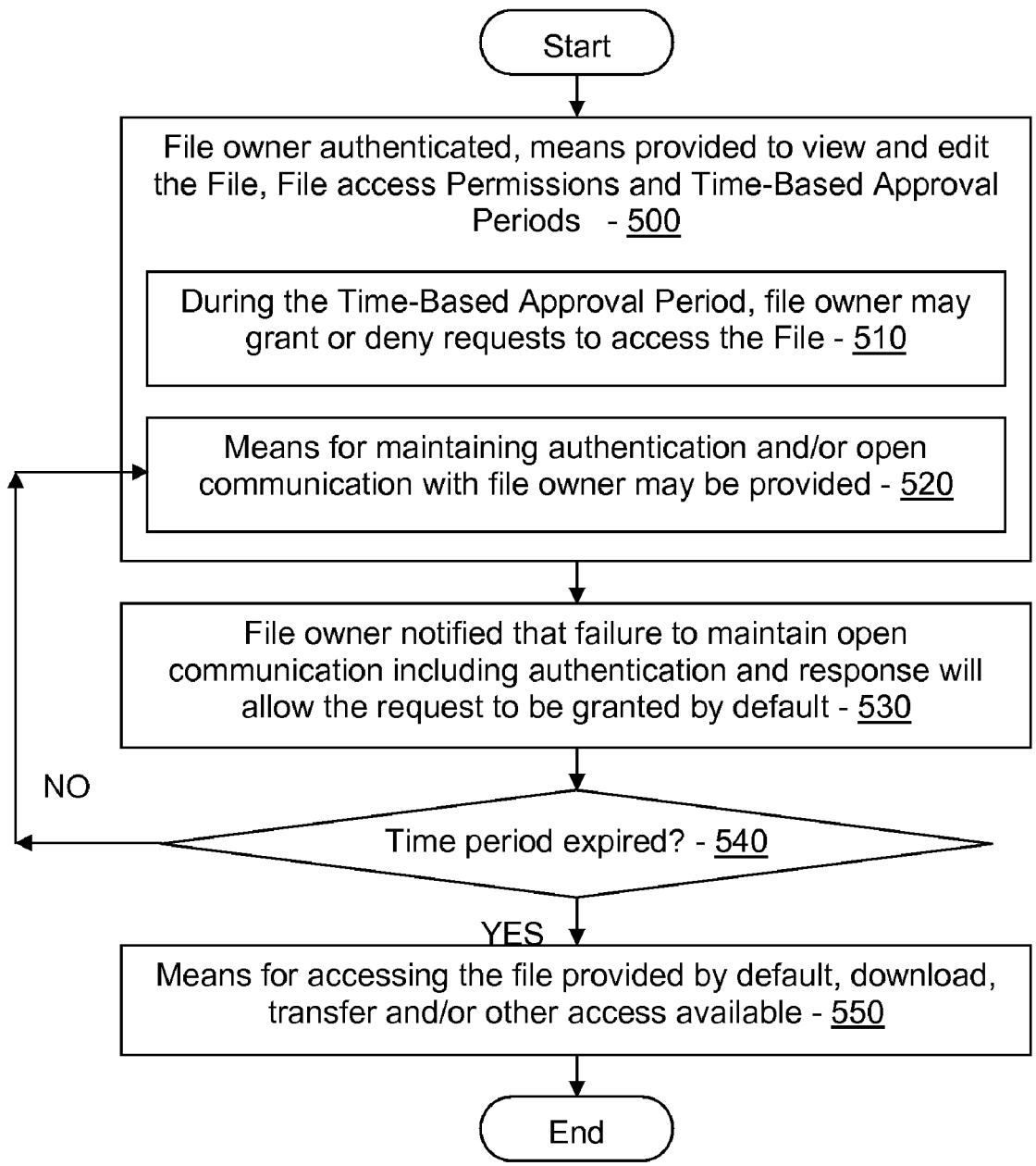
FIG. 5 is a flow diagram illustrating a possible embodiment of a method for safeguarding documents online.

Several different methods may be used to provide and manage the disclosed invention. In an example embodiment illustrated in FIG. 5, an File Storage Area 105 may be provided containing at least one File 110 which belongs to a file owner wherein the file owner may, after proper authentication, grant or deny access to the File 110 during a Time-Based Approval Period 400, and after which the file requestor may automatically access the File 110 with or without additional limitations. Such additional limitations may include any of the Means for denying File access 250 previously discussed, or use of the Time-Based Approval Period 400 to deny access to the File 110 discussed in more detail below.

The process starts by having a means provided for the file owner, after proper Authentication 115, to view and edit the File 110, any associated File access permissions 130 and any related Time-Based Approval Periods 400 (Step 500).

During the Time Based Approval Period 400, the file owner may respond to any request to access the File 110 by granting or denying the request to access the File 110 and communicating the response to the file requester (Step 510) as described in detail elsewhere in this disclosure.

In another embodiment, the request for access to the File 110 may not be required, so that the File 110 is simply made available for access/download/transfer, or denied after the expiration of the Time-Based Approval Period 400.

Because the expiration of the Time-Based Approval Period 400 may automatically grant the file requester access to the File 110, means may be provided for maintaining open communication with the file owner. Means may also be provided for requiring proper authentication regularly to ensure open communication with the file owner (Step 520).

In order to ensure such notification, the file owner may be notified at least once that failure to maintain open communication as described above or to respond to a request during the Time-Based Approval Period 400 will allow the request to access the File 110 to be approved by default (Step 530). The means for notification may be set by the Hosting Provider 120 in any time increment, including but not limited to minutes, hours, days, weeks, months, years, etc.

Once the Time-Based Approval Period 400 has expired (Step 540), means may be provided for accessing the File 110 by default. In one embodiment, access to the File 110 is provided to a specific file requestor. In another embodiment, the File 110 will be made available to any file requestor. In another embodiment, the Link or other means of accessing the file 125 may include a Tag 170 or other means of marking the Link 125 which may contain information allowing the next attempted access of the Link or other means of accessing the file 125 to begin a download, transfer or other access of the File 110 (Step 550).

In another embodiment, the file owner may set the expiration of the Time-Based Approval Period 400 to not only grant the File access permissions 130, but also deny them. By way of non-limiting example, such a grant or denial may be similar to a pocket veto in politics. Just as the pocket veto may allow the President or Congress to indirectly allow or veto a bill based on the action or inaction of the President or Congress during a pre-set period of time, the action or inaction of the file owner or file requestor (or other users) during the running of the Time-Based Approval Period 400 may indirectly allow the grant or denial of File access permissions 130 to the file requestor or other users who desire use the File 110.

In a non-limiting example embodiment, the option for approval is time-based. The file owner may specify a number of days, weeks, months, years etc. after which a request for a document will automatically be approved. The steps within the simple approval mechanism may also be integrated, however, in the time-based approval embodiment, the file owner may be notified, possibly many times, that if the file owner fails to respond to the request within the pre-specified time period, the request may be approved by default. This may give the file owner a chance to deny the request, but may approve the request after the Time-Based Approval Period 400 has elapsed. This type of approval may serve as a "deliver this if I die" type of service, allowing people to store copies of legal documents, or "personal messages" that need to be delivered to others. File owners may give family members or friends a link and tell them only to use it when needed. Until the file owner is unable to respond for some period of time, access to the documents may easily be denied.

File owners may still immediately approve/deny requests if they wish. A mechanism may also be provided where the owner is periodically emailed to ensure an open communication channel exists and/or that the file owner has logged in periodically. Such an open communication channel may further include proper authentication, accessing the means for the file owner to view and edit the File, response to a request, changing the Time-Based Approval Period, updating file owner contact information, monthly ping, any of the aforementioned or any combination thereof.

A Method of Authorizing an Unsolicited File Transfer

Figure 6:
FIG. 6 is a flow diagram illustrating a possible embodiment of a method for granting a predetermined recipient file access after authorization for an unsolicited file transfer and after a predetermined time period.

Several different methods may be used to provide and manage the disclosed invention. In an example embodiment illustrated in FIG. 6, a File 110 may be hosted within an Online File Folder 105 on a Hosting Computer 165 (Step 600). Authorization may be accepted from an Owner of the File 110 for an unsolicited file transfer to a Predetermined Recipient after expiration of a Predetermined Time Period 400 (Step 610), after which the Predetermined Recipient may automatically be given access to the File 110 (Step 620).

Figure 7:
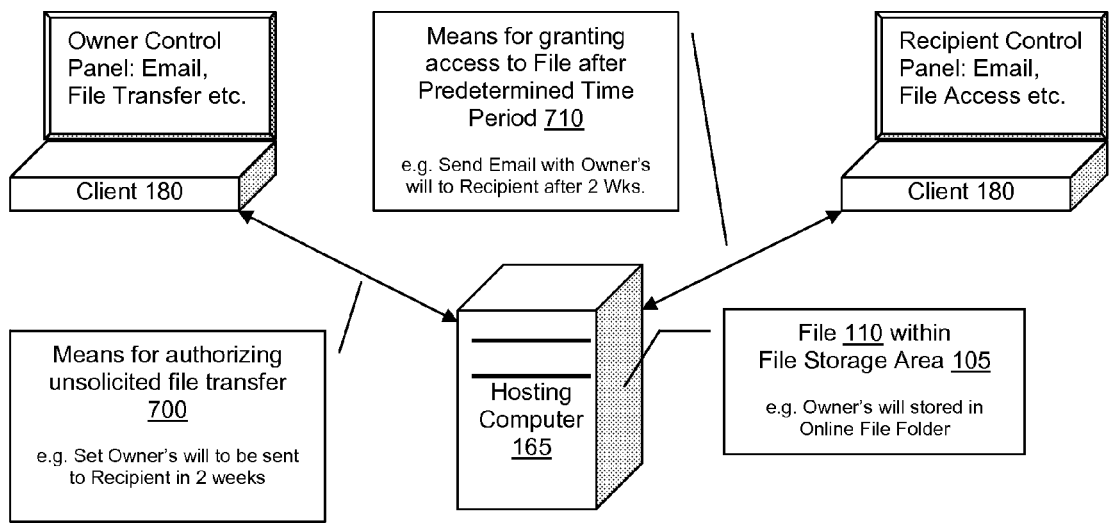
FIG. 7 illustrates a possible environment wherein a file may be hosted and transferred.

Several different environments may be used to complete the steps accomplished by the disclosed invention. FIG. 7 demonstrates a streamlined example of such an environment. A File 110 within an Online File Folder 105 may be stored on a Hosting Computer 165, and may be accessible to the File Owner via a Control Panel 155 on a Client 180. The Control Panel 155 may further include access to the File Owner's Email, and Means for authorizing the unsolicited file transfer 700.

A Predetermined Recipient may also have access to a Control Panel 155 via a Client 180. Means may be provided for granting access 710 to the File 110 after a Predetermined Time Period 400.

This environment may also include or integrate as necessary any of the elements shown in FIGS. 1, 2 and 4 and disclosed in detail elsewhere in this specification.

As a non-limiting example seen in FIG. 7, a File Owner may store a File 110 relating to his or her last will and testament within an Online File Folder 105 on a Hosting Computer 165 in preparation for leaving the country. The File Owner may use the Control Panel 155 on a Client 180 to set the File 110 relating to the will to be sent to a Predetermined Recipient after two weeks. The Predetermined Time Period may allow the File 110 relating to the will to be sent in the event that something happens to the File Owner while out of the country, but cancel the file transfer in the event that the File Owner returns safely. The unsolicited nature of the file transfer means that the Predetermined Recipient need never know of the file transfer upon the safe return of the File Owner.

However, if something happens to the File Owner, the Hosting Computer 165 via settings provided through the Control Panel 155, may send an email with access to the File 110 relating to the File Owner's will to the Predetermined Recipient after expiration of the two week time period. The Predetermined Recipient may then access the File 110 either through the Predetermined Recipient's email or via a Control Panel 155 on a Client 180.

Figure 8:
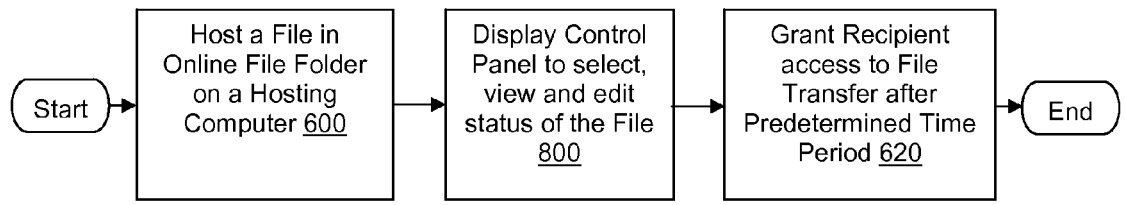
FIG. 8 is a flow diagram illustrating a possible embodiment including displaying a control panel to select, view and edit the status of the file.

An example embodiment shown in FIG. 8 shows that the step of granting the Predetermined Recipient access to the File 110 automatically after expiration of the Predetermined Time Period 400 (Step 620) may be preceded by a step of displaying a Control Panel 155 for selecting, viewing and editing the status of the File 110 (Step 800).

Figure 9:
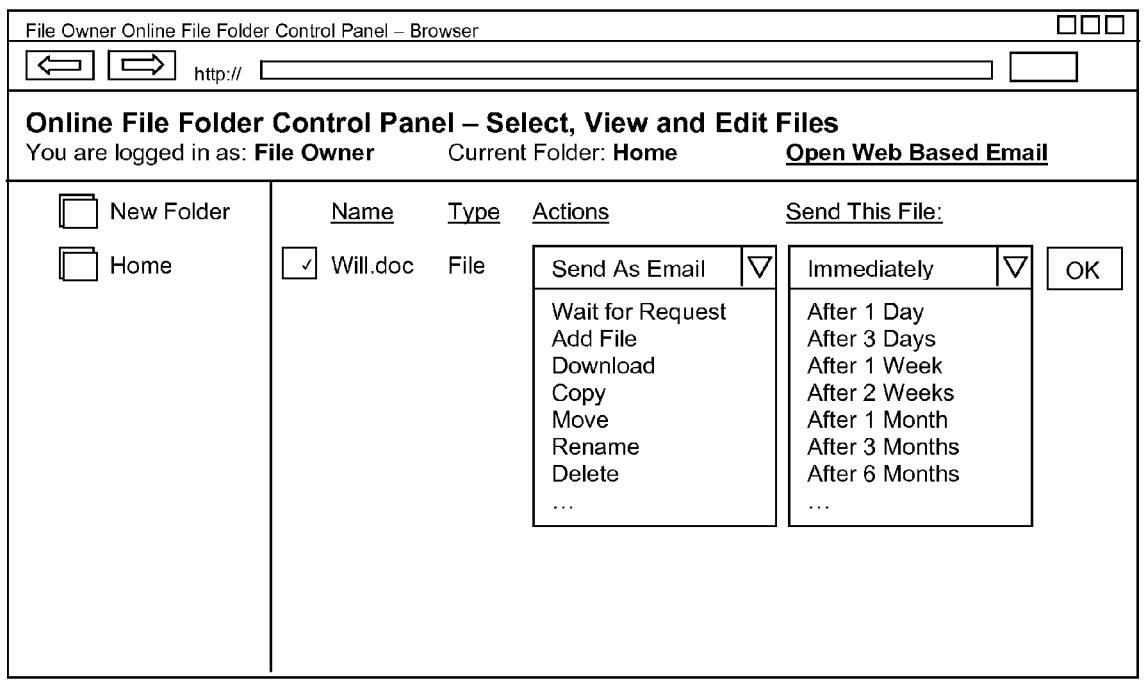
FIG. 9 illustrates a possible embodiment of an interface for enabling the unsolicited transfer of a file.
Figure 10:
FIG. 10 is a flow diagram illustrating a possible embodiment including accepting owner authorization for a file transfer.
Figure 11:
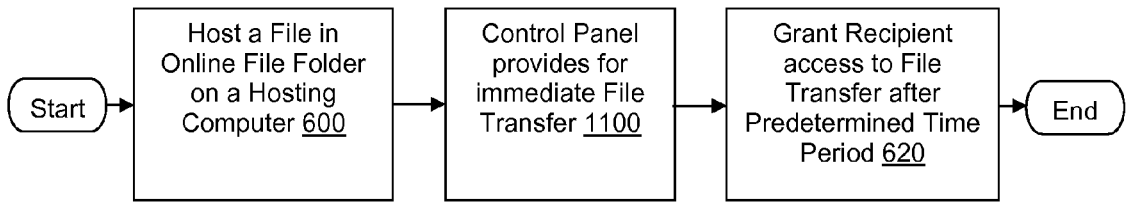
FIG. 11 is a flow diagram illustrating a possible embodiment including a control panel providing for immediate file transfer.
Figure 12:
FIG. 12 is a flow diagram illustrating a possible embodiment including designating a file transfer as owner initiated or requiring a request.
Figure 13:
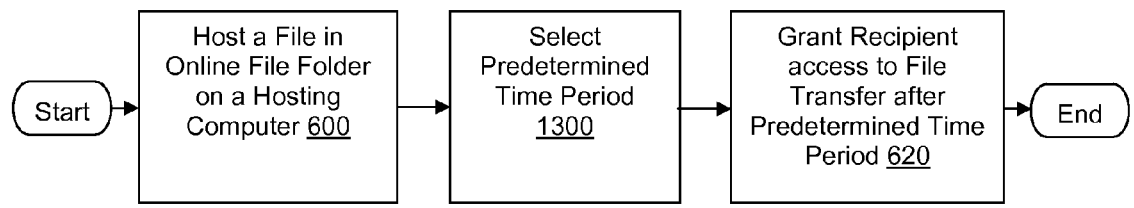
FIG. 13 is a flow diagram illustrating a possible embodiment including selecting a predetermined time period.

FIG. 9 shows an example user interface using the disclosed structure that may be used to display a Control Panel 155 for selecting, viewing and editing the status of the File 110 (Step 800). For example, a File Owner may select, using a checkbox, a File 110 such as "Will.doc" to be sent to a Predetermined Recipient. Drop-down menus may be used to select, view and edit the status of the File 110 (Step 800).

An example embodiment showed in FIGS. 10-13 show that the step of granting the Predetermined Recipient access to the File 110 automatically after expiration of the Predetermined Time Period 400 (Step 620) may be preceded by a step of accepting authorization from the File Owner for the file transfer (Step 1000), a step of the Control Panel 155 providing for immediate file transfer (Step 1100), a step of designating the file transfer as owner initiated or requiring a request from a requestor (Step 1200), and/or a step of selecting the Predetermined Time Period (Step 1300).

As is seen in FIGS. 10-13, these preceding steps may also be accomplished independently of each other prior to the Predetermined Recipient being granted access to the File 110 Transfer after a Predetermined Time Period 400 (Step 620).

FIG. 9 shows an example user interface using the disclosed structure that may accept authorization from the Owner for the file transfer. (Step 1000). For example, a File Owner may use the checkbox to represent authorization from the File Owner that Will.doc is to be transferred to a Predetermined Recipient. A File Owner may use a drop-down menu to select a Predetermined Time Period 400 (Step 1300), after which Will.doc may be sent. Such a Predetermined Time Period 400 may be divided into days, weeks, months, etc. One option may be included to allow the File Owner to send Will.doc immediately, thereby providing for immediate file transfer (Step 1100). The File Owner may use a drop-down menu to send Will.doc as an email, without requiring a request from a File Requestor, or to wait for a request from a File Requestor (Step 1200), as disclosed elsewhere in this application.

Figures 14, 15:
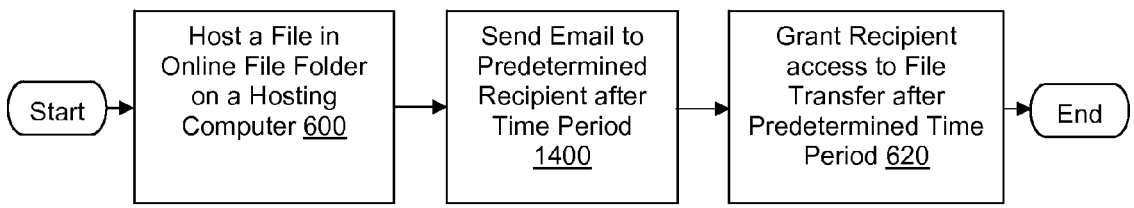
FIG. 14 is a flow diagram illustrating a possible embodiment including sending an email to a predetermined recipient after a predetermined time period.
FIG. 15 illustrates a possible embodiment of an interface for enabling an unsolicited transfer of a file.
Figure 16:
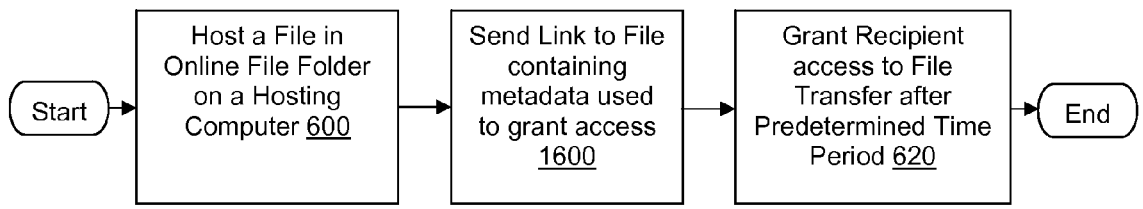
FIG. 16 is a flow diagram illustrating a possible embodiment including sending a link to a file containing metadata used to grant access.
Figure 17:
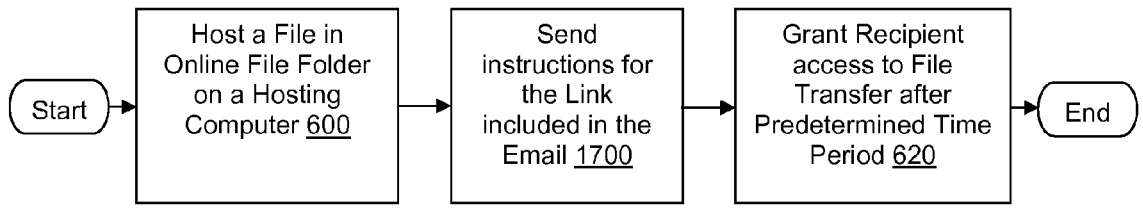
FIG. 17 is a flow diagram illustrating a possible embodiment including sending instructions for a link included in an email.
Figure 18:
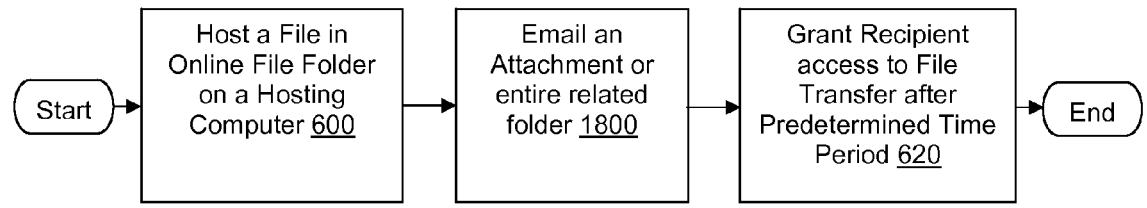
FIG. 18 is a flow diagram illustrating a possible embodiment including sending instructions for a link included in an email.
Figure 19:
FIG. 19 is a flow diagram illustrating a possible embodiment including an email goodbye with an emailed attachment.

An example embodiment shown in FIG. 14 shows that the step of granting the Predetermined Recipient access to the File 110 automatically after expiration of the Predetermined Time Period 400 (Step 620) may be preceded by a step of sending an Email to the Predetermined Recipient after the Predetermined Time Period (Step 1400). An interface shown in FIGS. 10 and 15 and described in detail elsewhere in this application may be used to accomplish this step.

An example embodiment shown in FIGS. 16-19 shows that the step of granting the Predetermined Recipient access to the File 110 automatically after expiration of the Predetermined Time Period 400 (Step 620) may be preceded by a step of sending a Link 125 to the File 110, the Link 125 containing metadata used to grant the Predetermined Recipient access to the File 110. (Step 1600), a step of sending instructions for the Link 125 included in the Email (Step 1700), a step of emailing the File 110 as an Attachment and/or emailing other files within a folder or designated portion of the Online File Folder 105 related to the File 110 (Step 1800) and/or a step of including a Video Goodbye with the emailed Attachment. (Step 1900).

As is seen in FIGS. 16-19, these preceding steps may also be accomplished independently of each other prior to the Predetermined Recipient being granted access to the File 110 Transfer after a Predetermined Time Period 400 (Step 620).

FIG. 15 shows an example user interface using the disclosed structure that may send a Link 125 to the File 110, the Link 125 containing metadata used to grant the Predetermined Recipient access to the File 110. (Step 1600). For example, a File Owner may select a checkbox to enter a Link 125 to Will.doc and use a text box or text field to enter a Link 125 to the file. Metadata may also be included in the Link 125, such as a file associated with a video goodbye (described below), or the folder which should be accessed. Such metadata may be selected via a checkbox and the metadata information entered into a text box or text field (Step 1600). The File Owner may select a checkbox to enter instructions for the Email into a text box or text field which instructs the Predetermined Recipient to download Will.doc and execute the instructions provided with it (Step 1700). The File Owner may select a checkbox to enter a link and/or path to Will.doc to be attached to the Email. Additionally, a File Owner may select a checkbox to include the entire Home folder associated with Will.doc (Step 1800). The File Owner may select a checkbox to enter a link and/or path to video.avi, a video to be included with Will.doc and to be attached to the Email (Step 1900).

Figure 20:
FIG. 20 is a flow diagram illustrating a possible embodiment including providing a predetermined recipient with a unique login to an online file folder.

An example embodiment shown in FIG. 20 shows that the step of accepting authorization from an Owner of the File 110 for an unsolicited file transfer to a Predetermined Recipient after expiration of a Predetermined Time Period 400 (Step 610) may be followed by a step of providing the Predetermined Recipient with a unique login to the Online File Folder 105. (Step 2000).

Figure 21:
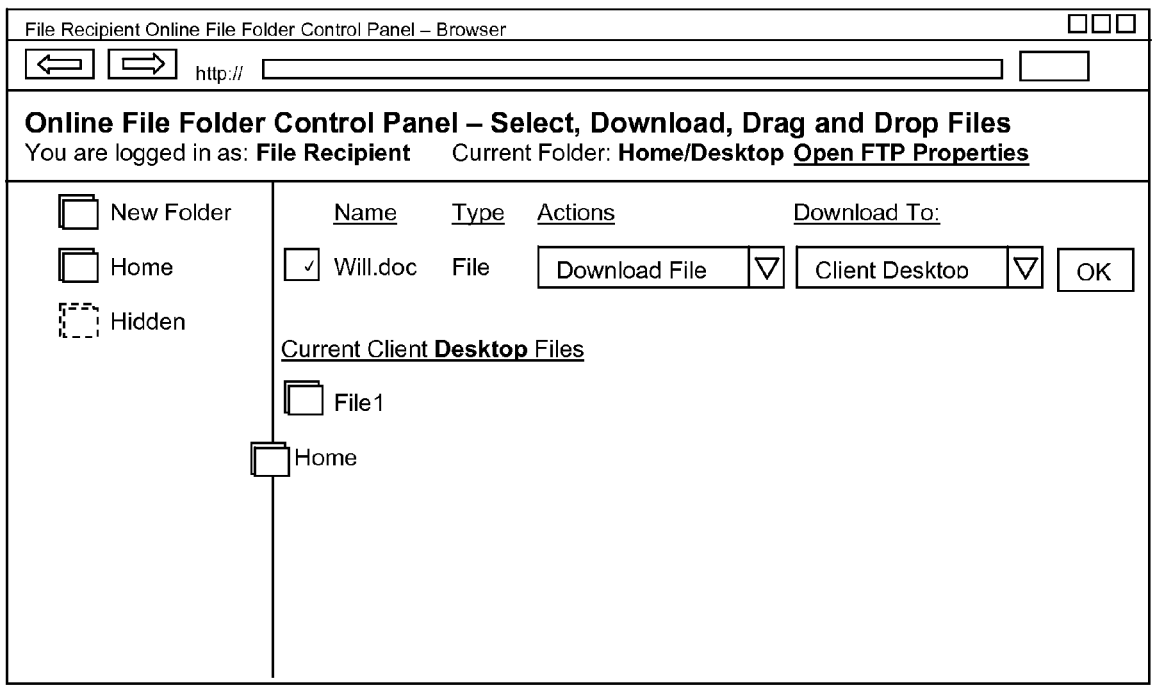
FIG. 21 illustrates a possible embodiment of an interface for enabling the unsolicited transfer of a file.

FIG. 15 shows an example user interface using the disclosed structure that may provide the Predetermined Recipient with a unique login to the Online File Folder 105. (Step 2000). For example, a File Owner may select a checkbox to provide entry of a login such as "Login" and a password such as "Password," which may be sent to the Predetermined Recipient as a means of accessing the Control Panel 155 and File 110 such as Will.doc. FIG. 21 shows an example user interface that may be provided to the Predetermined Recipient to allow access to Will.doc.

Figure 22:
FIG. 22 is a flow diagram illustrating a possible embodiment including transferring a file to a client via FTP after a unique login to an online file folder.

An example embodiment shown in FIG. 22 shows that the step of accepting authorization from an Owner of the File 110 for an unsolicited file transfer to a Predetermined Recipient after expiration of a Predetermined Time Period 400 (Step 610) may be followed by a step of transferring the File 110 to a Client 180 via File Transfer Protocol after a unique login to the Online File Folder 105. (Step 2200).

FIG. 21 shows an example user interface using the disclosed structure that may transfer the File 110 to a Client 180 via File Transfer Protocol after unique login to the Online File Folder 105. (Step 2200). For example, a Predetermined Recipient may select a checkbox to select Will.doc as the file to be downloaded and actions and destinations may be selected via drop-down menus, allowing Will.doc to be downloaded to the Client Desktop of the Predetermined Recipient's Client machine.

Figure 23:
FIG. 23 is a flow diagram illustrating a possible embodiment including dragging and dropping a file to a client to transfer the intended file.

An example embodiment shown in FIG. 23 shows that the step of accepting authorization from an Owner of the File 110 for an unsolicited file transfer to a Predetermined Recipient after expiration of a Predetermined Time Period 400 (Step 610) may be followed by a step of dragging and dropping the file to a Client 180 to transfer the intended File 110. (Step 2300).

FIG. 21 shows an example user interface using the disclosed structure that may drag and drop the file to a Client 180 to transfer the intended File 110 (Step 2300). For example, a Predetermined Recipient may click the "Home" folder and drag and drop it to the "Current Client Desktop Files" on the Predetermined Recipient's Client 180 machine.

Figure 24:
FIG. 24 is a flow diagram illustrating a possible embodiment including accessing only a granted set of intended available and visible files after unique login.

An example embodiment shown in FIG. 24 shows that the step of accepting authorization from an Owner of the File 110 for an unsolicited file transfer to a Predetermined Recipient after expiration of a Predetermined Time Period 400 (Step 610) may be followed by a step of accessing only a set of intended available and visible files after unique login to the Online File Folder 105 (Step 2400).

FIG. 21 shows an example user interface using the disclosed structure that may access only a set of intended available and visible files after unique login to the Online File Folder 105 (Step 2400). For example, a Predetermined Recipient may login to the Control Panel 155 and the "Home" folder may be visible to download or drag and drop, but based on the unique login, the folder "Hidden" may not be available to the Predetermined Recipient, thus making it impossible to download or drag and drop to the Predetermined Recipient's Client 180 machine.

A Method of Alerting a File Owner of a Contact Failure

Figure 25:
FIG. 25 is a flow diagram illustrating a possible embodiment of a method for alerting an owner via a second contact of a contact failure with a first contact.

Several different methods may be used to provide and manage the disclosed invention. In an example embodiment illustrated in FIG. 25, a File 110 may be hosted within an Online File Folder 105 on a Hosting Computer 165 (Step 600). A First Contact for an Owner of the File 110 may be verified, the First Contract being associated with an unsolicited file transfer to a Predetermined Recipient after expiration of a Predetermined Time Period 400 (Step 2500). If the First Contact Fails, the Owner may be alerted via a Second Contact 2610 (Step 2510).

Figure 26:
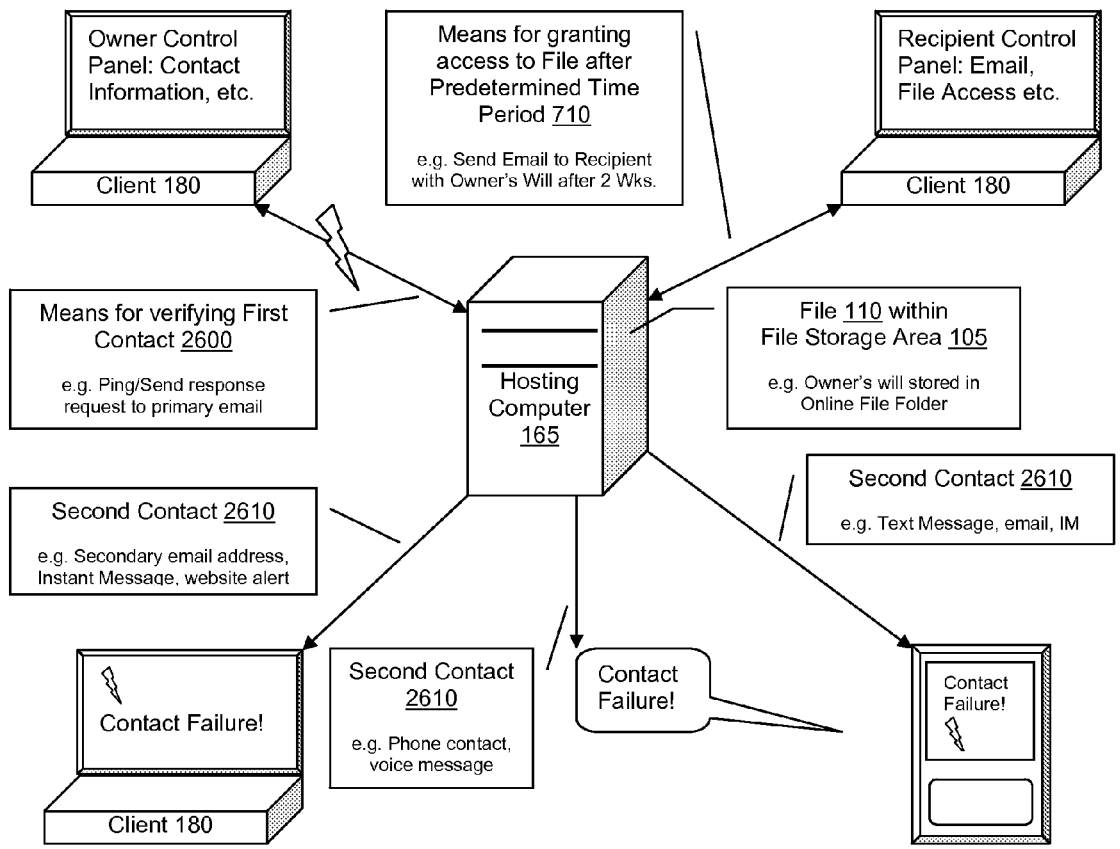
FIG. 26 illustrates a possible environment wherein an owner may be alerted of a contact failure.

Several different environments may be used to complete the steps accomplished by the disclosed invention. FIG. 26 demonstrates a streamlined example of such an environment. An example environment shown and described relating to FIG. 7 may be used for the unsolicited file transfer to a Predetermined Recipient after expiration of a Predetermined Time Period 400. A Means for verifying the First Contact 2600 may be used to ensure that contact is maintained with the Owner to avoid unintended transfer of the File 110.

If contact with the First Contact is lost or interrupted, one or more Second Contacts 2610 may be used to alert the Owner of the File 110 of the Contact Failure. These secondary contacts may be on a Client 180 computer, a cell phone, a PDA or any other method of contact now known or later developed in the art. Non-limiting examples of such contacts may also include a primary email address, a secondary email address, an instant message, a website alert, a voice message a text message or any other means of contact now known or later developed in the art.

This environment may also include or integrate as necessary any of the elements shown in FIGS. 1, 2, 4 and 7 and disclosed in detail elsewhere in this specification.

As a non-limiting example seen in FIG. 7, a File Owner may use the Control Panel 155 on a Client 180 to store the information for First Contact and Second Contact 2610 information. The Hosting Computer 165 may ping or otherwise send a response request to a primary email address as a Means of verifying the First Contact. If this email address were to fail or be interrupted, or if no response was received from this email address, the Hosting Computer 165 may send an alert of the contact failure to any stored Second Contact 2610, including a secondary email address, instant message, website alert, phone contact, voice message or text message.

Figures 27, 28:
FIG. 27 is a flow diagram illustrating a possible embodiment including displaying a control panel for storing first and second file owner contacts.
FIG. 28 illustrates a possible embodiment of an interface for storing first and second file owner contacts.

An example embodiment shown in FIG. 27 shows that the step of alerting the Owner via a Second Contact 2610 if the First Contact fails (Step 2510) may be preceded by a step of displaying a Control Panel 155 for storing the First Contact and Second Contact 2610 for the Owner of the File 110 (Step 2700).

FIG. 28 shows an example user interface using the disclosed structure that may be used to display a Control Panel for storing the First Contact and Second Contact for the Owner of the File (Step 2700). For example, a File Owner may input, using text boxes or text fields, dropdown menus and check boxes, information for a first contact email address such as "owner@email.com." This email may be designated as the primary email and as the First Contact for the File Owner. All First and Second Contacts 2610 may be listed within the Control Panel 155 and various contacts may be selected, possibly via a checkbox, as the First Contact.

Figure 29:
FIG. 29 is a flow diagram illustrating a possible embodiment including displaying a countdown to the expiration of a predetermined time period on a control panel.

An example embodiment shown in FIG. 29 shows that the step of alerting the Owner via a Second Contact 2610 if the First Contact fails (Step 2510) may be preceded by a step of displaying a Countdown to expiration of the Predetermined Time Period 400 (Step 2900).

Figure 30:
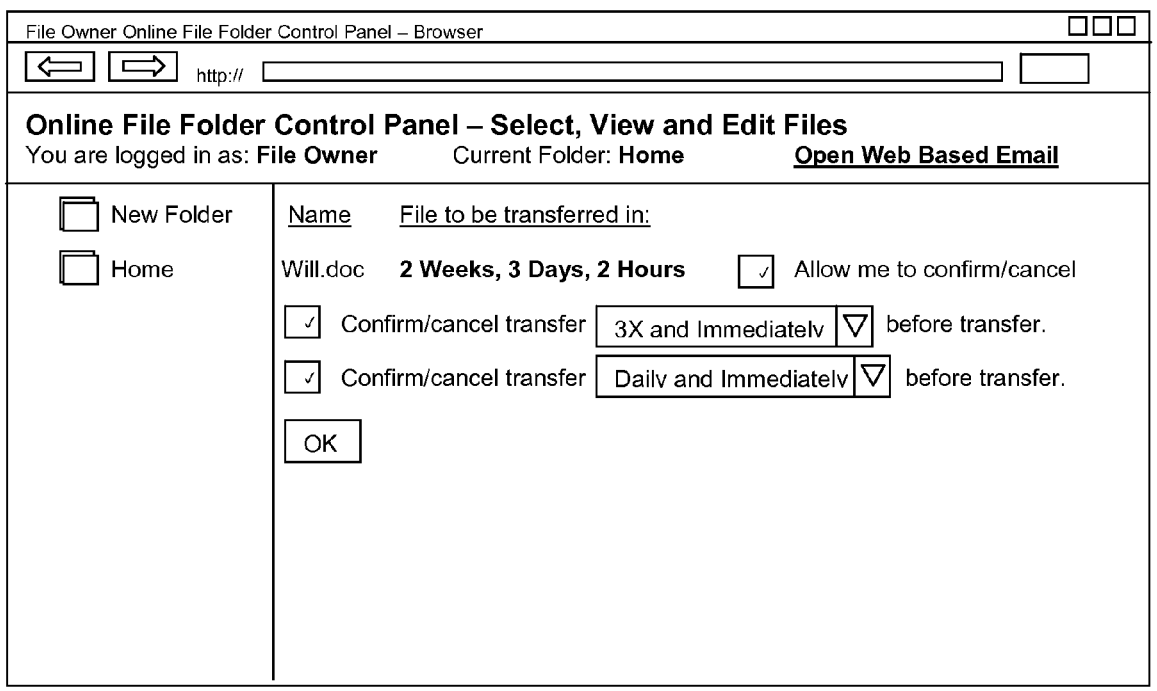
FIG. 30 illustrates a possible embodiment of an interface for storing settings to confirm or cancel a file transfer.

FIG. 30 shows an example user interface using the disclosed structure that may be used to displaying a Countdown to expiration of the Predetermined Time Period 400 (Step 2900). For example, the Control Panel 155 may display that Will.doc will be transferred in 2 weeks, 3 days and 2 hours.

Figure 31:
FIG. 31 is a flow diagram illustrating a possible embodiment including confirming a file transfer through stored contact information for the file owner.

An example embodiment shown in FIG. 31 shows that the step of alerting the Owner via a Second Contact 2610 if the First Contact fails (Step 2510) may be preceded by a step of confirming the file transfer through a Stored Contact for the Owner. (Step 3100).

FIG. 30 shows an example user interface using the disclosed structure that may be used to confirm the file transfer through a Stored Contact for the Owner. (Step 3100). For example, the File Owner may select a displayed checkbox to allow confirmation to be sent to the File Owner to confirm that Will.doc should be transferred after the Predetermined Time Period 400 of 2 weeks, 3 days and 2 hours.

Figure 32:
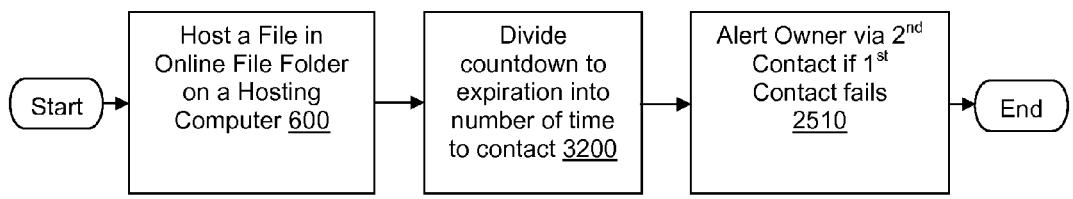
FIG. 32 is a flow diagram illustrating a possible embodiment including dividing a countdown to expiration into a number of times to contact the file owner.

An example embodiment shown in FIG. 32 shows that the step of alerting the Owner via a Second Contact 2610 if the First Contact fails (Step 2510) may be preceded by a step of dividing the Countdown to expiration of the Predetermined Time Period 400 into a selected number of times to contact the Owner. (Step 3200).

FIG. 30 shows an example user interface using the disclosed structure that may be used to divide the Countdown to expiration of the Predetermined Time Period 400 into a selected number of times to contact the Owner. (Step 3200). For example, the File Owner may select a displayed checkbox to allow confirmation or cancellation by the File Owner which allows the File Owner to be contacted 3 times between the display and 2 weeks, 3 days and 2 hours from the display. The File Owner may also choose an option to provide for a confirmation/cancellation option immediately before the transfer.

Figure 33:
FIG. 33 is a flow diagram illustrating a possible embodiment including sending a confirmation to a stored contact at regular intervals.

An example embodiment shown in FIG. 33 shows that the step of alerting the Owner via a Second Contact 2610 if the First Contact fails (Step 2510) may be preceded by a step of sending confirmation to the Stored Contact at regular intervals. (Step 3300).

FIG. 30 shows an example user interface using the disclosed structure that may be used to send confirmation to the Stored Contact at regular intervals. (Step 3300). For example, the File Owner may select a displayed checkbox to allow confirmation or cancellation by the File Owner which allows the File Owner to be contacted daily between the display and 2 weeks, 3 days and 2 hours from the display. The File Owner may also choose an option to provide for a confirmation/cancellation option immediately before the transfer.

Figure 34:
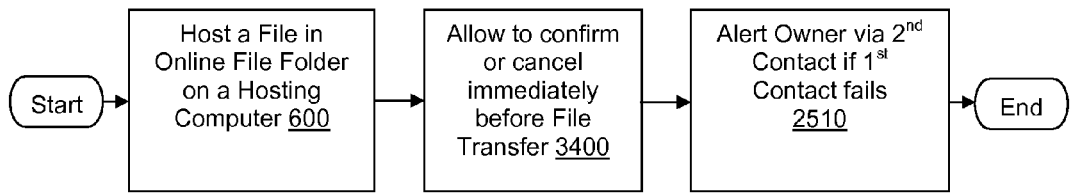
FIG. 34 is a flow diagram illustrating a possible embodiment including allowing a file owner to confirm or cancel a file transfer immediately before the file transfer.

An example embodiment shown in FIG. 34 shows that the step of alerting the Owner via a Second Contact 2610 if the First Contact fails (Step 2510) may be preceded by a step of allowing the File Owner to confirm or cancel the file transfer immediately before the File Transfer. (Step 3400). An interface shown in FIG. 30 and described in detail elsewhere in this application may be used to accomplish this step.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method comprising the steps of:
   a) hosting an online file storage on one or more server computers communicatively coupled to a network; and
   b) receiving, from a file owner interface accessible to a file owner after authentication and hosted on the one or more server computers hosting the online file storage, a selection of at least one file from a list of one or more files uploaded exclusively by the file owner, a designation of the at least one file as an automatic access file, a time period and an authorization for an unsolicited file transfer of the at least one file to a predetermined recipient after an expiration of the time period, wherein the file owner interface is configured to:
      i. view and edit the one or more files, one or more access permissions associated with each of the one or more files, the time period and the expiration of the time period; and
      ii. send an email to the predetermined recipient, wherein the email comprises a user interface control comprising one or more HTML tag attributes configured to access the at least one file and wherein, responsive to the expiration of the time period, the user interface control is updated to reflect the authorization for the unsolicited file transfer and is embedded into the email, and wherein, responsive to the predetermined recipient accessing and downloading the at least one file, the one or more HTML tag attributes are updated to reflect removal of the authorization.

2. The method of claim 1 further comprising the step of displaying a control panel for selecting, viewing and editing the status of the at least one file.

3. The method of claim 2 wherein the control panel accepts the authorization from the file owner for the unsolicited file transfer.

4. The method of claim 3 wherein the control panel provides for immediate file transfer.

5. The method of claim 3 wherein the control panel comprises means for designating the unsolicited file transfer as owner initiated or requiring a request from a requestor.

6. The method of claim 3 wherein the control panel comprises means for selecting the time period.

7. The method of claim 6 wherein the control panel comprises means to send the email to the predetermined recipient after expiration of the time period.

8. The method of claim 7 wherein the email comprises a link to the file, the link containing metadata used to grant the predetermined recipient access to the at least one file.

9. The method of claim 7 wherein the email comprises instructions for the link.

10. The method of claim 7 wherein the email comprises an attachment to the email, the attachment comprising the at least one file.

11. The method of claim 7 wherein the email comprises an attachment to the email, the attachment comprising the file and any other files in a folder or a designated portion of the online file storage containing the at least one file.

12. The method of claim 11 wherein the attachment includes a video goodbye.

13. The method of claim 1 wherein the step of granting the predetermined recipient access to the at least one file comprises the step of providing the predetermined recipient with a unique login to the online file storage.

14. The method of claim 13 wherein the predetermined recipient transfers the at least one file to a client via file transfer protocol after unique login to the online file storage.

15. The method of claim 14 wherein the predetermined recipient drags and drops the file to one or more client computers to transfer the intended at least one file.

16. The method of claim 13 wherein the predetermined recipient accesses only a set of intended available and visible files after unique login to the online file storage.

17. A system comprising:
   a) one or more server computers comprising an online file storage, wherein the one or more server computers are communicatively coupled to a network; and
   b) a file owner interface hosted on the one or more server computers hosting the online file storage, displayed on one or more client computers operated by a file owner, accessible to the file owner after authentication and comprising:
      i. a document storage controls interface comprising a control panel configured to upload, save, view and edit one or more files uploaded exclusively by the file owner and to view and edit one or more access permissions associated with each of the one or more files;
      ii. an access permissions interface configured to receive from the file owner a selection of at least one file from the list of one or more files, a designation of the at least one file as an automatic access file, a time period and an expiration of the time period after which the at least one file will be automatically accessible by a predetermined recipient; and
      iii. a sharing controls interface configured to create, view or edit a user interface control comprising one or more HTML tag attributes configured to access the at least one file, wherein, responsive to the expiration of the time period, the user interface control is updated to reflect an authorization for an unsolicited file transfer and is embedded into an email sent to the predetermined recipient to authorize the unsolicited file transfer, and wherein, responsive to the predetermined recipient accessing and downloading the at least one file, the one or more HTML tag attributes are updated to reflect removal of the authorization.

* * * * *